United States Patent

[11] 3,628,403

| [72] | Inventor | Pierre Labat |
| | | 8 quai Galliene, Suresnes, France |
| [21] | Appl. No. | 73,908 |
| [22] | Filed | Sept. 21, 1970 |
| [45] | Patented | Dec. 21, 1971 |
| [32] | Priority | Oct. 3, 1969 |
| [33] | | France |
| [31] | | 6933935 |

[54] POWER-ASSISTED CHANGE-SPEED TRANSMISSION MECHANISMS
2 Claims, 5 Drawing Figs.

| [52] | U.S. Cl. | 74/335 |
| [51] | Int. Cl. | F16h 5/06 |
| [50] | Field of Search | 74/335 |

[56] References Cited
UNITED STATES PATENTS

| 2,432,712 | 12/1947 | Bachman et al. | 74/335 |
| 2,451,160 | 10/1948 | Eaton | 74/335 |
| 3,053,102 | 9/1962 | Alfieri | 74/335 |
| 3,074,291 | 1/1963 | Alfieri | 74/335 |
| 3,472,282 | 10/1969 | Page et al. | 74/335 X |

*Primary Examiner*—Arthur T. McKeon
*Attorney*—Stevens, Davis, Miller & Mosher

ABSTRACT: A power-assisted control device for a change-speed transmission mechanism providing a plurality of gear ratios engageable at will, which comprises a gear selector adapted to perform a directed movement of selection and a directed movement of engagement of the gear ratios of said transmission mechanism, a manually operated gear change lever, a servo action device operatively connected to said gear selector, means responsive to said gear change lever for actuating said servo action device, characterized in that there are provided, as a power-assisted control device, a pair of single-acting pneumatic actuators of the cylinder and piston type wherein the pistons acting in opposition on said gear selector, are immersed in the lubricant of the transmission casing with their faces opposite to the pneumatic control chamber of said actuators, each piston aforesaid forming a damping chamber having a fixed wall in the casing, with at least one throttling passage for the lubricant between said casing and said damping chamber.

POWER-ASSISTED CHANGE-SPEED TRANSMISSION MECHANISMS

This invention relates to power-assisted or servoaction change speed transmission mechanism providing a plurality of gear ratios engageable at will, and comprising a gear selector adapted to perform a directed movement for selecting the gear ratios and a directed movement for engaging the selected gear ratio of the transmission mechanism, a manually operated gear change lever, a servoaction control device operatively connected to said gear selector, means responsive to said gear change lever for actuating said servoaction control device, and, between said lever and said selector, a connecting device incorporating a mounting having a resilient lost motion so directed as to be responsive to the reaction of the control effort required for producing the directed movement of said selector for engaging a gear, said resilient lost motion mounting coacting with said servoaction control device in such a manner that said device is actuated when the manual control effort exerted by the driver on said selector exceeds a predetermined value.

Hitherto known servocontrol systems of this character utilize double-acting pneumatic actuators of the piston and cylinder type as servoaction devices.

Since the stroke of the piston of pneumatic actuator of this character takes place in two steps when engaging a gear ratio, namely a resistant stroke section corresponding to the synchronizing phase and a section corresponding, when the synchronization is obtained, to the actual engagement of the dog clutches corresponding to the desired gear ratio, it appeared that some means had to be provided for damping notably the second phase stroke generated by a sudden expansion of the compressed air in the corresponding control chamber of the pneumatic actuator at the end of the synchronizing phase.

To control the rate of expansion in the two directions of movement of the piston in the double-acting cylinder, the use of hydraulic damping means or dashpots has already been proposed. However, it was observed that devices equipped with these damping means are extremely difficult to manufacture due to the fluidtightness problems to be solved, and the necessity of holding the hydraulic fluid, i.e. oil, within a variable volume.

It is the essential object of the present invention to provide a simple yet efficient solution to this problem by resorting to a power-assisting device comprising a pair of pneumatic, single-acting actuators of which the pistons acting in opposition on the selector have their faces opposed to the pneumatic control chamber of the pneumatic actuator immersed in the lubricant of the change speed mechanism, each piston further forming in the cylinder a damping chamber bounded by a fixed wall of the casing of the change speed mechanism which comprises at least one passage for throttling the flow of lubricant between the mechanism and said damping chamber, and vice versa.

A typical form of embodiment of the present invention will now be described by way of example with reference to the accompanying drawing, in which.

Figure 2:
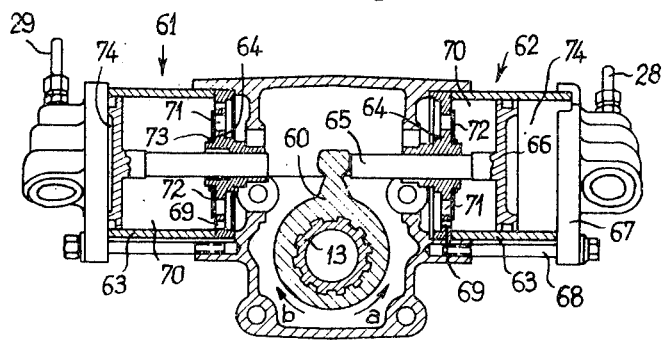
FIG. 2 is a sectional view of the same device, taken along the line II—II of FIG. 1, on a smaller scale.
Figure 5:
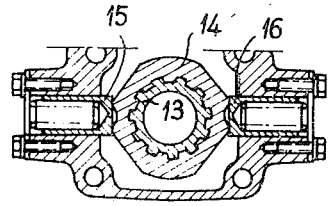
FIG. 5 is a sectional view taken on a smaller scale along the line V—V of FIG. 1.

The change speed transmission mechanism illustrated is of conventional design and departs from the hitherto known systems mainly in that single-acting cylinder and piston actuators are used for controlling the selector when engaging the desired gear ratios, as shown in FIG. 2.

The selector utilized in this invention comprises a shaft 1 slidably mounted and revolving in a portion 2 of a change speed transmission mechanism of the sliding-hub type (not shown). This shaft 1 carries members 3 adapted to coact with component elements of the mechanism so that, as conventional in the art, the movement of translation impressed to shaft 1 along the axis X-Y will effect through these selecting members the selection of at least one gear ratio, the rotation of the same shaft 1 about its axis in one or the other direction (arrow $a$ or $b$, FIG. 2) causing the engagement of the desired gear ratio. Thus, for example, the members 3 coact with the conventional sliding control members of the sliding-hub devices of the transmission mechanism (not shown). More particularly, a control system of this character is illustrated and described in the U.S. Pat. No. 3,431,791 of Mar. 11, 1969 of same applicant.

In the arrangement according to this invention power assistance is added to the movement of engagement of the selected gear ratio (arrow $a$ or $b$) according to the manual effort exerted on the gear change lever 4, otherwise mechanically connected to selector 1, so that the necessary gear selecting movements (along axis X-Y) and gear engaging movements (arrow $a$ or $b$) can be impressed thereto. The control lever 4 is of the type comprising a ball-and-socket type coupling 5 mounted in the portion 2 of the transmission casing with a certain resilient play or liberty of action, as will be seen presently, and comprises a control arm 6 formed with a ball shaped outer end 7 engaging a socket rigid with another arm 8 keyed to the selector shaft 1, so that this shaft 1 can be moved in translation as well as in rotation by means of said control lever 4. The shaft 1 is adapted (in a manner known per se and not shown herein) to be guided by using a conventional grid wherein the neutral transverse line corresponds to the movement X-Y of shaft 1. In this example the shaft 1 has its end remote from control lever 4 responsive to return and axial positioning means comprising concentric springs 10, 11 arranged within the hollow end portion of shaft 1 so as to urge same in the axial direction X-Y in the intermediate position shown in the drawings. These return means are no part of the present invention and may therefore be omitted or replaced by other equivalent means; consequently, they are not described hereinafter, the only purpose of the illustration given in FIG. 1 being to afford a clearer understanding of the manner in which spring 10 weaker than spring 11 acts as a return spring in both directions of the permissible stroke 12 between the bearing cups provided at the ends of this spring, the stronger spring 11 permitting when necessary a longer axial movement of shaft 1 in the left-hand direction as seen in the drawing.

Figure 1:
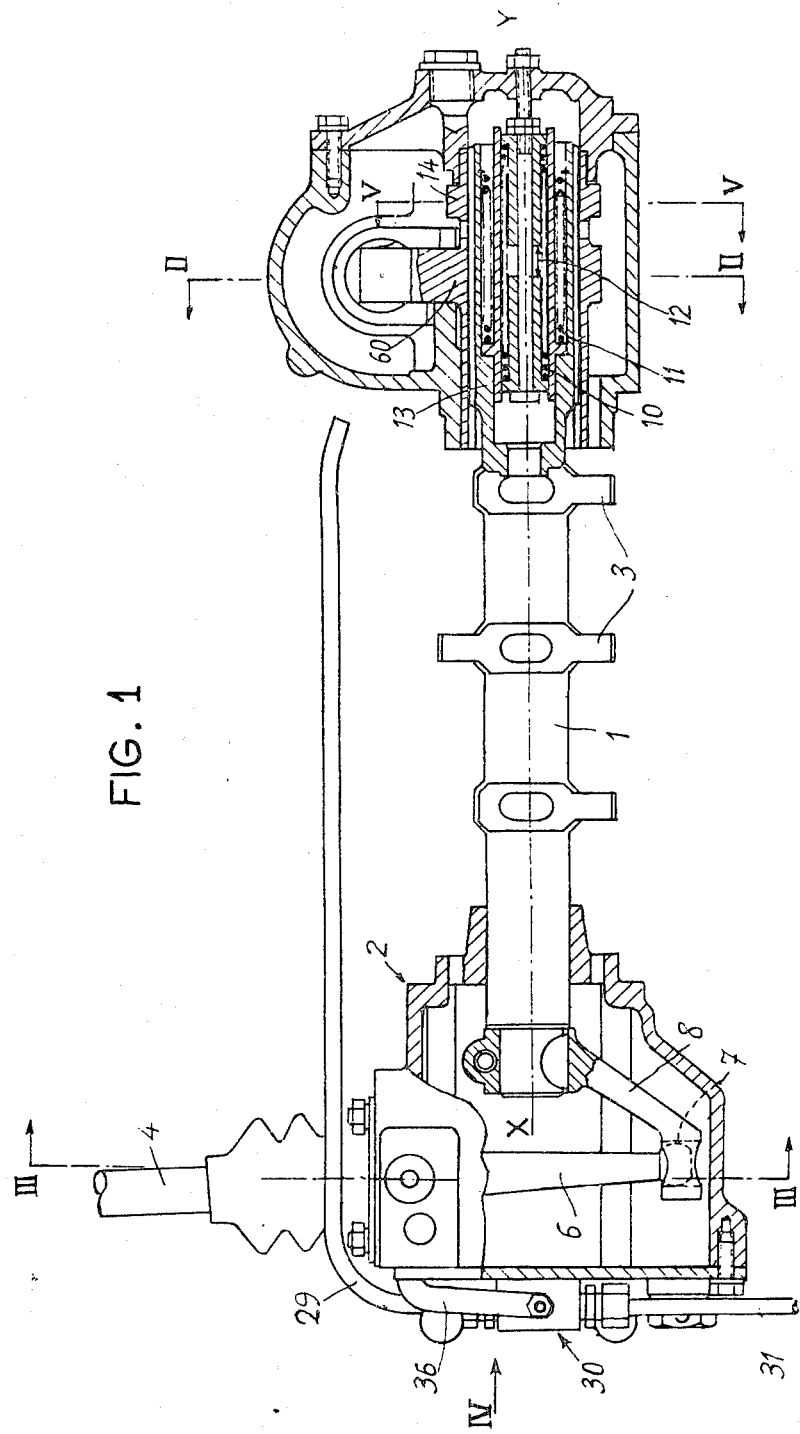
FIG. 1 is a general diagrammatic view of the change speed system according to this invention, with a fragmentary section taken along the longitudinal axis of the selector.

Moreover, shaft 1 is responsive at the same end on the one hand to a device for resiliently holding said shaft in an angular position corresponding to neutral, which is also optional in the practical embodiment of the present invention, and on the other hand to a rotational servoaction device visible in FIGS. 1 and 2.

The corresponding end of shaft 1 is formed with outer splines 13 slidably engaging corresponding inner splines formed in an angular holding cam 14, a plurality of spring-loaded detent-positioning studs 15, 16 coacting in mutual opposition with said cam 14, and also with a control arm 60 coacting in mutual opposition according to the arrangement constituting the subject matter of this invention with a pair of single-acting cylinder and piston units or actuators designated in general by the reference numerals 61 and 62 (FIG. 2).

The cylinders 63 of these actuators are mounted in fluid-tight manner in bores formed in the casing, each bore receiving a wall 64 through which the rod 65 of piston 66 of the same actuator is slidably mounted, the cylinder being assembled with the casing through the medium of the cylinder bottom 67 and also of tie rods 68 screwed in a case rigid with the transmission casing and communicating with the interior of said casing.

Each wall 64 is formed with passages 69 providing a permanent communication between the transmission casing and the chamber 70 formed between said wall and the actuator piston 66, the mutual arrangement of the two actuators being such that the piston is thus immersed on the rod side in the lubricant (not shown) of the transmission mechanism which normally fills the chambers 70. Each wall 64 is further provided with fluid passages 71 of greater cross-sectional dimension than passages 69, said fluid passages 71 coacting adjacent the chambers 70 with nonreturn valves 72 each consisting of a metal washer movable in translation in relation to said wall and retained in the axial direction by a snapring 73.

Figure 4:
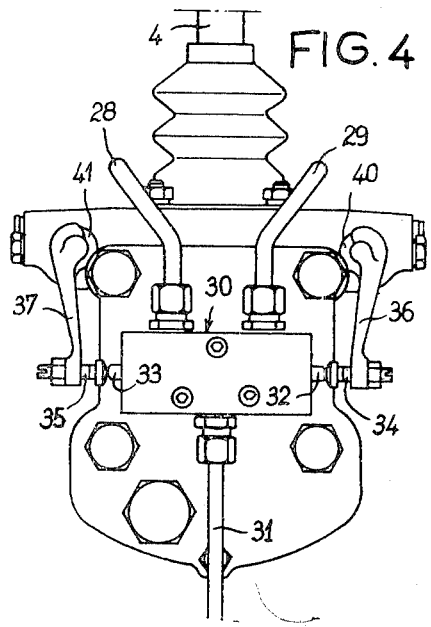
FIG. 4 is an end view of the device as seen in the direction of the arrow IV of FIG. 1.

The pneumatic control chambers 74 of said actuators are connected via unions or like means provided in the bottom of cylinder 67 and through corresponding pipe lines 28 and 29 to a compressed air distributor 30 having a feed line 31. This distributor is of a type capable in the inoperative condition of venting to the atmosphere of chambers 74 of said actuators, and to pressurize one or the other of these actuators according as either of said two control rods 32 or 33 of the movable distributor system (see FIG. 4) is depressed or not against the resilient force of a return spring disposed within the distributor. Under these conditions the distributor 30 may be of any suitable and known design, a typical example thereof being shown and described in the aforesaid applicant's patent.

Figure 3:
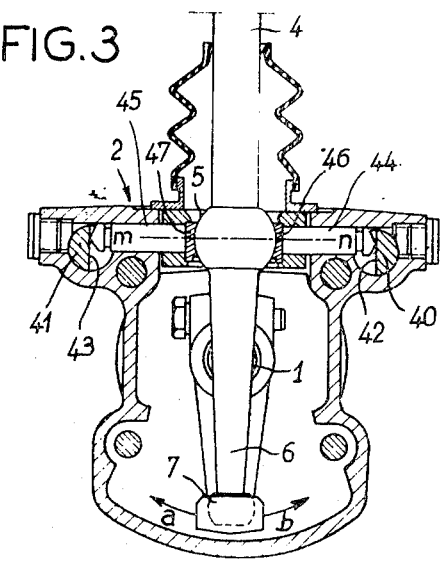
FIG. 3 is a section taken along the line III—III of FIG. 1.

Coacting with the rods 32, 33 urged away from each other by the inner spring of the distributor are bearing fingers 34, 35 adjustably mounted by means of screw means to the end of levers 36, 37 respectively, these levers being fulcrumed to the portion 2 of the transmission casing by means of pivot pins 40, 41. These pins are formed (see FIG. 3) with flat faces 42, 43 engaged in the eccentric position by one end of a pair of push members 44, 45, respectively, these push members bearing with their opposite ends on a pair of shoes 46, 47 constituting a spherical bearing surrounding the ball 5 of lever 4.

This spherical bearing of ball 5 is thus adapted to move in the axial direction MN of push members 44, 45 and resiliently controlled by the aforesaid springs mounted within the distributor 30. This distributor will thus control the value of the effort beyond which the bearing of ball 5 is adapted to move along said axis M-N as a reaction against the effort to be exerted at 7 on the control arm 6 of lever 4 for rotatably actuating the selector shaft 1 when engaging a gear ratio (arrow *a* or *b*).

It is clear that beyond a predetermined reaction force on ball 5 the distributor 30 will be actuated in one or the other direction so as to deliver via pipe line 28 or 29 compressed air to either of chambers 74 of actuators 61 or 62, thus giving the desired power assistance to the selector movement.

This assistance is thus applied and maintained during the resistant synchronization phase of the dogs involved in the gear ratio to be engaged preliminary to the positive dog engagement, the stroke of these dogs depending on an expansion of the compressed air introduced into the corresponding pneumatic control chamber when the synchronization eventually obtained permits the free mutual engagement of said dogs; however, this power assistance will cease automatically, of course, as a consequence of the return of said distributor to its inoperative condition, when the effort to be exerted on lever 4 becomes inferior to the one corresponding to the predetermined reaction effort necessary for displacing the ball 5 of lever 4.

Instead of being sudden, the aforesaid expansion of the compressed air and therefore the gear engagement stroke are damped out, according to the present invention, as a consequence of the throttling of lubricating liquid forced from the corresponding chamber 70 through throttling passages 69 into the transmission casing; in this case, the passages 71 are closed by the nonreturn valves 72. On the other hand, these nonreturn valves 72 permit the stroke in the opposite direction without retarding the corresponding piston, when disengaging the previously engaged gear, and also when engaging another gear involving the actuation of the opposite cylinder and piston unit having its inherent damping means, as explained hereinabove.

Of course, this invention is applicable as well to a change speed mechanism in which the selection movement corresponds to a rotational movement of the selector member, and the gear engagement movement corresponds to a movement of translation of said selector member, which would then constitute the power assisted movement.

Besides, various modifications and variations may be brought to the specific from of embodiment of the invention which is illustrated and described herein, without departing from the basis principle of the invention as set forth in the appended claims.

What is claimed is:

1. A power-assisted control device for a change speed transmission mechanism providing a plurality of gear ratios engageable at will, which comprises a gear selector adapted to perform a directed movement of selection and a directed movement of engagement of the gear ratios of said transmission mechanism, a manually operated gear change lever, a servoaction device operatively connected to said gear selector, means responsive to said gear change lever for actuating said servoaction device, characterized in that there are provided, as a power-assisted control device, a pair of single-acting pneumatic actuators of the cylinder and piston type wherein the pistons, acting in opposition on said gear selector, are immersed in the lubricant of the transmission casing with their faces opposite to the pneumatic control chamber of said actuators, each piston aforesaid forming a damping chamber having a fixed wall in the casing, with at least one throttling passage for the lubricant between said casing and said damping chamber.

2. A power-assisted control device for a change speed transmission mechanism as set forth in claim 1, characterized in that said wall is formed with at least one passage incorporating a nonreturn valve in the direction from said damping chamber to said casing.

* * * * *

UNITED STATES PATENT OFFICE
CERTIFICATE OF CORRECTION

Patent No. 3,628,403          Dated December 21, 1971

Inventor(s) Pierre LABAT

It is certified that error appears in the above-identified patent and that said Letters Patent are hereby corrected as shown below:

The assignee SOCIETE ANONYME de VEHICULES INDUSTRIELS et d' EQUIPEMENTS MECANIQUES SAVIEM was omitted from the Letters Patent. Please correct this on your records and send correction to the undersigned.

Signed and sealed this 17th day of October 1972.

(SEAL)
Attest:

EDWARD M. FLETCHER, JR.        ROBERT GOTTSCHALK
Attesting Officer                Commissioner of Patents